United States Patent [19]

Brink

[11] Patent Number: 5,014,249
[45] Date of Patent: May 7, 1991

[54] METHOD IN A REAL TIME CONTROL SYSTEM FOR SEISMIC INTERFERENCE

[75] Inventor: Mundy Brink, Drammen, Norway
[73] Assignee: Geco A.S., Sankvika, Norway
[21] Appl. No.: 491,103
[22] Filed: Mar. 9, 1990

[30] Foreign Application Priority Data

Mar. 17, 1989 [NO] Norway ................................ 891184

[51] Int. Cl.$^5$ .......................... G01V 1/28; G01V 1/30
[52] U.S. Cl. ..:.................................. 367/63; 367/15; 367/38
[58] Field of Search .................. 367/15, 21, 23, 24, 367/59, 38, 63; 181/110

[56] References Cited

U.S. PATENT DOCUMENTS 3,638,175  1/1972  Stone ...................................... 367/63
4,910,716  3/1990  Kirlin et al. ........................... 367/24

FOREIGN PATENT DOCUMENTS 0201643  11/1986  European Pat. Off. .............. 367/21

Primary Examiner—Ian J. Lobo
Attorney, Agent, or Firm—Fleit, Jacobson, Cohn, Price, Holman & Stern

[57] ABSTRACT

A method in real time control systems for seismic interference to indicate an acceptable level of interference in relation to the amplitude, angle of incidence, and frequency of a seismic reflection signal, and to remove such interference loaded signals during seismic surveys, comprises steps to determine lower threshold values of coverage, identify interference and amplitude anomaly in the recorded signal of reflection, estimate the expected value of amplitude characteristic of the signal on the basis of recorded amplitude characteristics of recorded signals from one or a plurality of preceding series of survey, mark time windows in which interference and/or amplitude anomaly are identified, generate a table of the number of times a certain time window was marked in the series of recordings of the same point of reflection, assign limits on the number of interference events to various marked time windows, and remove from the recordings those time windows wherein the number of interference events exceeds the limit.

14 Claims, 2 Drawing Sheets

METHOD IN A REAL TIME CONTROL SYSTEM FOR SEISMIC INTERFERENCE

BACKGROUND OF THE INVENTION

The present invention relates to a method in a real time control system for seismic interference.

In marine seismic surveys a relatively intense acoustic impulse is generated at regular intervals, for instance by use of so called air guns. Such guns thus generally emit impulsive acoustic signals. If a number of seismic surveys occur in a limited area, acoustic signals from each separate survey may be recorded by the seismic streamer of another survey and cause deteriorated data quality. When a shot is fired, the shot generated pressure waves are recorded at a plurality of measuring points or channels provided in a seismic streamer. The recording time of a certain reflector or point of reflection is determined by the distance of the measuring point from the source of sound, and the depth of the reflector. Recording may, however, be masked by simultaneous recording of pressure waves or reflection signals from another simultaneous seismic survey, and such recordings will overlay the signals from one's own survey and provide a seismic interference in the recording curves. The seismic interference will prevent detection of the reflections occurring in one's own survey. The recording time when this seismic interference occurs with the subsequent shot will depend on how much the simultaneously occurring seismic surveys are mutually out of step. Firing intervals generally being based on a fixed distance in the direction of movement, the degree of being out of step is determined by the velocity of one's own survey vessel and that of another vessel or other vessels, as well as by the course of the vessels.

A seismic streamer generally has a length of approximately 3000 m with an array of, e.g. 240 measuring points or channels, and a typical firing interval of 25 m. The common reflection points or CMP's in the Earth's crust are, thus, covered several times, i.e. by different measuring points or channels along the streamer with several shots. In case of a series comprising a plurality of shots which are fired at determined intervals with the vessel being in motion, reflections from the same CMP will be received, and the reflection waves will be received on different channels in the listening streamer. It is a fact well-known to those skilled in the art, that reflections from the same point in the Earth's crust, for instance the sea floor, are recorded at different measuring points along the seismic streamer for different shots. This phenomena is called coverage. In other words, coverage indicates how many different shots contributed to a series of recordings belonging to the same CMP or common reflection point. The separate recordings or measurements are summed after having been subjected to different, predetermined corrections or other data processing.

The amplitude of the recorded reflection signals is attenuated as a function of travel time. This is, inter alia, due to absorption along the longer path of propagation, and spherical dissipation. The above-mentioned seismic interference will, thus, be especially disturbing with increasing recording time and attenuated recorded amplitudes, and especially with an increasing level of interference relative to the level of amplitude.

According to prior art interference problems caused by a number of simultaneous seismic surveys are generally handled by interrupting data collection. Then an agreement is reached on a division of available survey time among different surveys. If the amplitudes of the interfering pressure waves are below a predetermined value, e.g. 20 $\mu$bars and/or if the interfering sound waves have certain angles of incidence, e.g. from the rear, as opposed to the sound waves from one's own survey which has a frontal incidence, one's own acoustic source being towed in front of the seismic streamer, a predetermined level of interference may in some cases be accepted. If not, it will be necessary to interrupt one's own seismic survey and valuable production time is lost.

The great disadvantage of carrying out a seismic survey in an interference loaded environment is due to the fact that there is an element of uncertainty as to how much interference may be accepted as a function of the amplitude angle of incidence of the interference signal, and the shot frequency in relation to geological targets of the seismic survey. Additionally, necessary information to make a proper decision as to an acceptable level of interference will generally not be available. Other kinds of information are, thus, necessary to make a realistic assessment of the interference problem. At the same time there is also the problem that often there are no operators present on the survey vessel who are qualified to make a comprehensive assessment when interference phenomena occur, and on the basis of information available according to prior art.

Consequently, a conservative attitude often prevails as regards accepting interference. In practice, this means that collection of data is generally interrupted and an agreement is reached about division of available production time among the various surveys. This will obviously result in loss of valuable survey time for parties involved.

BRIEF SUMMARY OF THE INVENTION

It is an object of the present invention to provide a method which makes available necessary information to make decisions as to an acceptable level of interference, and to take measures to control or remove interference from the detected signals without having to interrupt the survey, a possibility of handling the problem of interference in real time substantially being achieved.

Said objects and other advantages are achieved by the present invention wherein the method thereof is divided into two parts, i.e. one part relating to preliminary planning of the survey, and one part relating to real time monitoring of the survey. Both parts are based on considering seismic interference to be a problem related to coverage, as defined above, in contrast with prior art which is especially based on assessment of amplitude and direction.

BRIEF DESCRIPTION OF THE DRAWINGS

The method according to the invention will be described in more detail below, with reference to the accompanying drawing, wherein.

DETAILED DESCRIPTION

Figure 1:
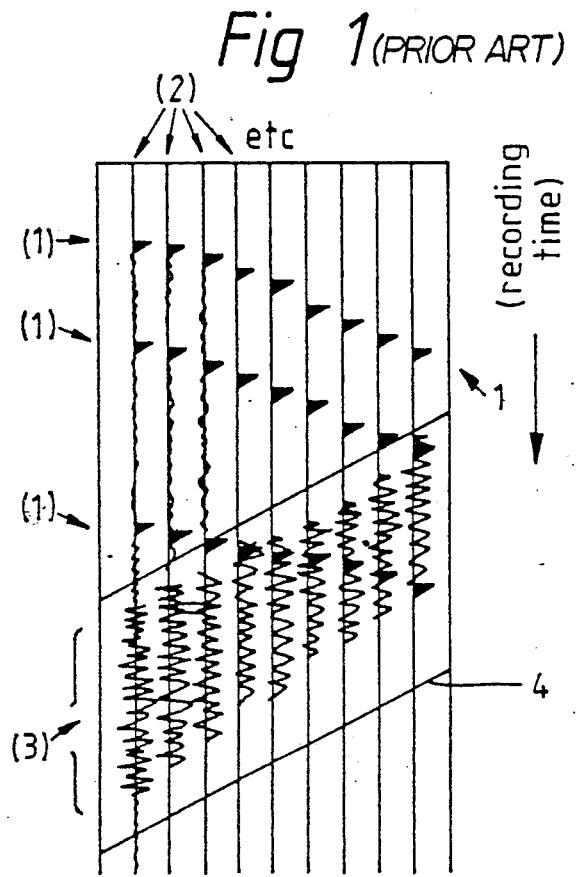
FIG. 1 is a graphical showing of a seismic survey system according to present art, burdened with interference.

FIG. 1 shows diagrammatically how a seismic survey is performed. A shot is fired, and shot generated sound waves 1 are detected along a series of measuring points or channels 2 along the seismic streamer. The vertical axis indicates the time of detection and variation in time is indicated by the arrow. The horizontal axis shows different measuring points or channels, their distance from the source increasing from the left to the right hand side. It will appear that reflection signals 1 from a certain reflector arrive at later times with increasing distance from the source. Signals 3 originate from another simultaneously performed seismic survey and constitute the seismic interference. It will appear that this interference masks the reflections occurring in one's own survey. It will also appear that the interference, which is due to another source, not one's own, occurs with a different variation of time from that of one's own reflection signals on various channels.

Figure 2:
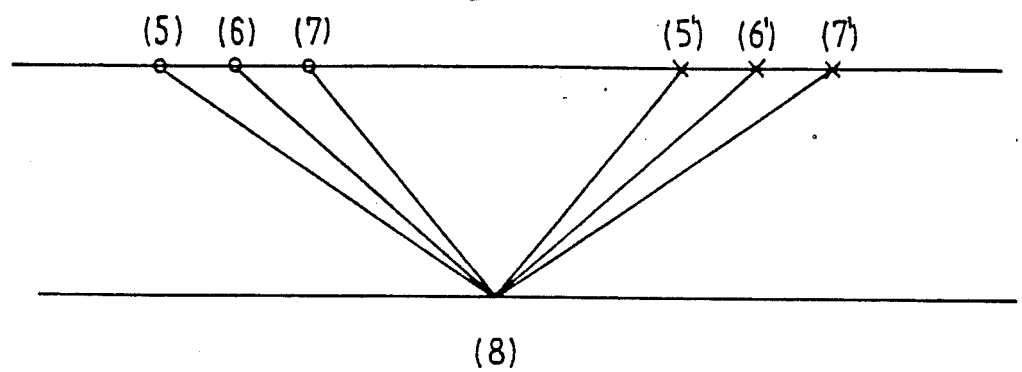
FIG. 2 is a diagrammatical view of emission, propagation, and reception of acoustic signals in seismic surveys.

In FIG. 2 the horizontal axis indicates a space dimension representing the survey profile. Here, separate shots 5, 6, 7 are separated in space and time along said profile, and the reflected wave is received at measuring points or channels 5', 6', 7' which are provided at determined mutual intervals in the seismic streamer. Numeral 8 designates CMP or the common reflection point of various shots in the measuring series. Obviously, the detection time of the the reflection signal depends on the two-way travel time between the point of the shot and the measuring point. Shot 5 and measuring point 5', thus, are associated and show the shortest travel time, whereas shot 7 and measuring point 7' represent the same signal and have the longest travel time. The object of this part of the method, relating to preliminary planning of the survey, is to determine threshold values or limits of acceptable or unacceptable occurrences of interference in the received signals, depending on the specific targets of the planned seismic survey. These threshold values may vary from one survey to the next and, thus, must be predetermined for each survey. This may be done by previous analysis of seismic data in the area of interest by the aid of a method which will be discussed in more detail below.

As mentioned above, coverage indicates how many different shots are contributing to reflection from the same point of reflection in the Earth's crust. Coverage is determined by the shot point interval as well as by the number of channels in the streamer. This is obviously well-known to those skilled in the art. If one assumes that the time intervals in which interference loaded data are present, as shown at 3 in FIG. 1, are removed, this would result in reduced coverage of said time intervals in recordings, i.e. along the vertical axis in FIG. 1. When all recordings of the same point of reflection are summed, the sum would comprise fewer recordings in keeping with said reduced coverage. The reduction of the recordings would vary with recording time.

Since interference is to be considered a problem of coverage, the method will aim at analyzing data which were collected during previous series of recordings with varying degrees of coverage reduction due to the fact that single recordings were removed in summation of each previous point of reflection. This reduction may for instance be achieved by letting recordings of single shots or time windows in recordings of a sequence of shots or of shots in another preferred sequence be equal to zero. On the basis of recording results of reduced coverage and, thus, also reduced quality, those skilled in the art can readily assess what coverage would still provide a satisfactory result as regards the possibility of mapping the geological conditions which are to be recorded. In this connection, it is quite possible to use advanced data processing techniques which are otherwise used for follow-up processing, in order to provide a maximum realistic result for the acceptable reduction of coverage in the part of the method comprising preliminary planning.

In addition to finding the reduction of coverage as discussed above, it will commonly also be of interest to find which measuring points or channels may possibly be left out or dispensed with. Generally, such channels should be equally distributed along the seismic streamer for each point of reflection. It is for instance not desirable to loose too many channels in the foremost portion of the seismic streamer, closest to the source of shots. This determination of which measuring points may be omitted, may be considered part of the analysis of the reduction of coverage, since it is necessary to select the channels which are set to zero in the analysis.

Since the tests to be made during preliminary planning are based on reduction of coverage by removing part of the recordings, interference loaded data are not needed to make such an analysis. This is a considerable advantage as compared with prior art which is based on analysis of the level of amplitude relative to level of interference and noise.

The part of the invention relating to a method for real time monitoring was developed especially to be used for instance aboard a survey vessel. In this connection the method will generally be implemented on for instance a computer and for communication with the user, terminals, displays and, if desired, printers for printing the monitoring information will be used, as usual.

Figure 3:
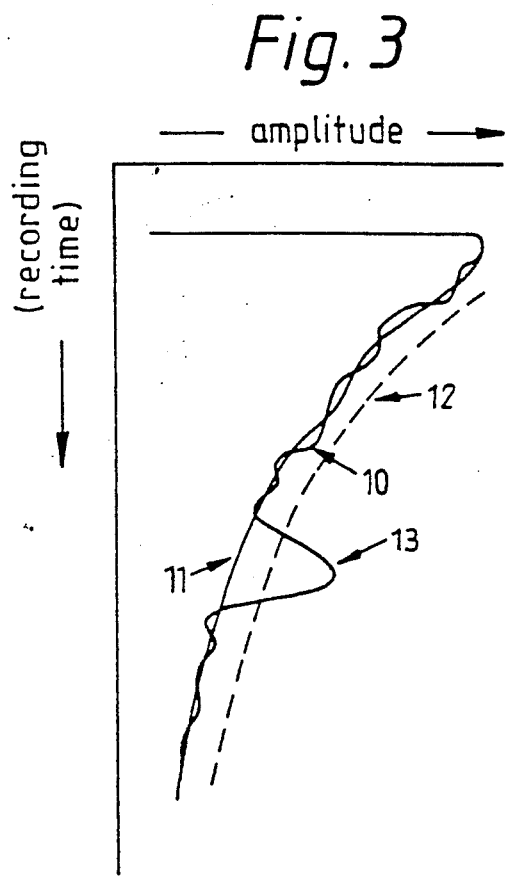
FIG. 3 graphically illustrates recorded and expected amplitude curves.

During real time monitoring interference and amplitude anomalies are identified by comparison of detected amplitudes or their rms values which are calculated for short time intervals in the recordings of e.g. 0.2 s, as a function of time, with an expected amplitude variation. The expected amplitude variation is generated and updated by the aid of the recorded sequences for at least some of the preceding shots, so that the expected amplitude variation is always a weighted average of the last shots. In FIG. 3 a typical rms amplitude curve 10 is shown as a function of recording time, whereas the expected amplitude variation is designated 11. This is an expression of the reduction of the sine amplitude as a function of recording time due to spherical dispersion and absorption along the path of propagation. Additionally, amplitude variations are determined by geological conditions and so-called shot generated noise. Amplitudes above a predetermined threshold or limit 12, as compared with expected amplitude variations 11, are identified as an anomaly. Prior art comprises a number of advanced methods to simplify identification of interference and amplitude anomalies. Summations of recordings at adjacent measuring points may for instance be used with such time shifts that a meaningfull summation of in-phase interference is achieved. At the same time, or alternatively, it is possible to make an estimation of the exact time when interference occurs, on the basis of extrapolation of the time interval between occurred interference in some of the previous series of recordings. Amplitude deviations are, preferably, analyzed in time intervals of, e.g. 0.5 s, so that any established anomalies may be associated with certain time intervals or time windows, and the latter may be marked. It is essential that the necessary calculations are simplified so that they may occur in real time, i.e. during survey operation. To this end, the area in a record series for one shot, a so-called shot file, which is burdened with interference, may be regarded as a quadrangle as will appear from FIG. 1. Such a quadrangle has typically a parallellogram shape and may be found by determination of the exact starting time of an interference phenomena in two of the channels of the seismic streamer, these preferably being spaced apart by some hundred meters, and by measuring the duration of the interference event. In order to eliminate the hazard of underrating negative consequences of interference, said duration may be set slightly longer than actually measured. It may thus be assumed that the exact time of beginning and duration of the interference or amplitude anomaly occurrence are known for all recordings in all channels. Due to this simplification it will be sufficient to make comparisons of rms amplitudes of recordings which were only made in two channels of the seismic streamer.

Figure 4:
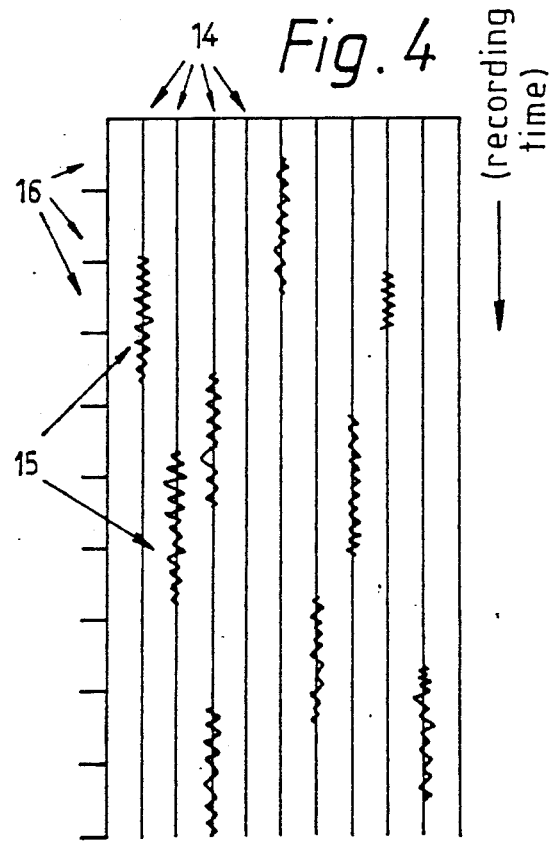
FIG. 4 shows graphically how interference may occur in different time windows at different measuring points or channels.

Another step of the real time monitoring part comprises generating a table or list of the number of times different time windows in the seismic recordings to be summed up because they originate from the same point of reflection, were marked. These marks may appear in quite different time windows of the recording, depending on the interference times of different shots contributing to the reflection from the actual point of reflection. This is shown in FIG. 4. All separate recordings 14 derive from the same point of reflection, but from different shots. Interference 15 is identified and associated with different time windows 16 of the recording period. The current state of interference expressed by the number of events in each time window may for instance be shown on a display in the form of a histogram, as diagrammatically indicated in FIG. 5. Time windows are designated 16, and events in each time window are designated 17. This histogram is updated after each shot, until all shots contributing to this point of reflection have been fired. It is possible to draw a tolerance limit of interference in the same histogram, i.e. the maximum number of interference events which are acceptable in each time window. Obviously, different limits may be set for different time windows, for instance a more restricted tolerance in those time windows of the recording time that are of most interest to the seismic survey in progress. Comparison of histogram values with threshold values, obviously, do not require special knowledge, as opposed to the known methods, and may indeed, be carried out by operators commonly present aboard the survey vessel.

Figure 5:
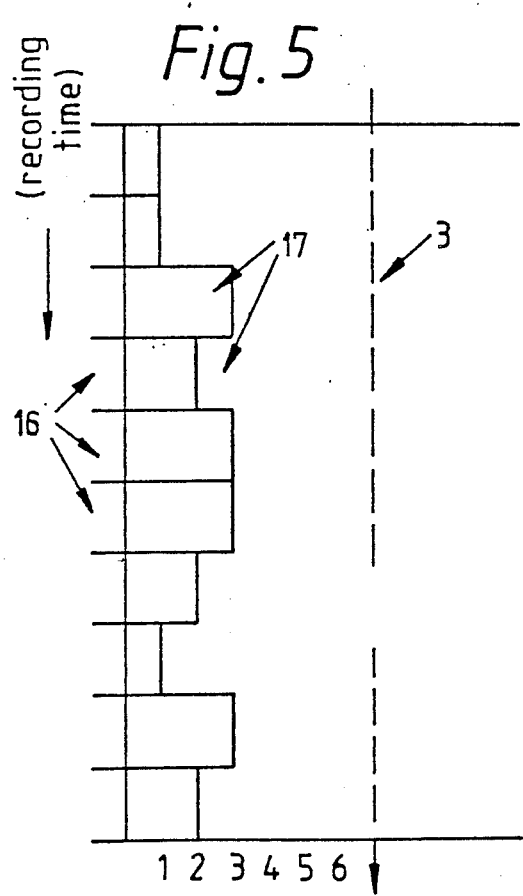
FIG. 5 is a histogram showing the total number of interference phenomena on different channels for a certain time window.

In connection with the method according to the present invention it may also be of interest to keep an eye on which recordings of a point of reflection were marked, i.e. in which channel of the seismic streamer they were recorded. Generally, a uniform distribution of measuring points or channels along the seismic streamer (a so-called offset) is desirable in order to achieve an optimal sum or so called stack response. Such a kind of monitoring is well known in so-called three dimensional collection of data. Channel distribution or offset may be monitored by having the information shown in FIG. 5 represented in several histograms, each of which contains information of a consecutive group of channels in the seismic streamer. It is for instance possible to select a group of measuring points or channels close to the source of shots, another group located in the middle of the streamer, and a third one at the end of the streamer. A large number of variants of this feature will, obviously, be possible.

If interference appears in the shape of plane waves in the shot recordings or the representation of the interference event is simplified to the quadrangle denoted 4 in FIG. 1, the point of time of an event as a function of offset, i.e. the localization of the channel in the seismic streamer, may be represented by only two points in time plus the duration of the event. If an integer 2M is now the maximum coverage of each point of reflection, it will only be necessary to monitor every M'th point of reflection. Real time monitoring is, thus, simplified and may for instance be carried out by the aid of a minicomputer aboard the vessel.

The above disclosed method according to the present invention is based on the feature that time windows which were marked are removed in subsequent processing of the seismic data. This, obviously, is the strictest manner of eliminating interference and amplitude anomalies, as the signals in the same time window are also removed. It is, of course, possible to envisage more sophisticated methods, for instance the use of signal analysis and signal processing to remove interference and, possibly, to recover the desired signals so that there is considerably less reduction of coverage. Consequently, the method according to the present invention is to be regarded as relatively conservative, since it only indicates the lowest acceptable degree of coverage which may possibly be used.

Figure 6:
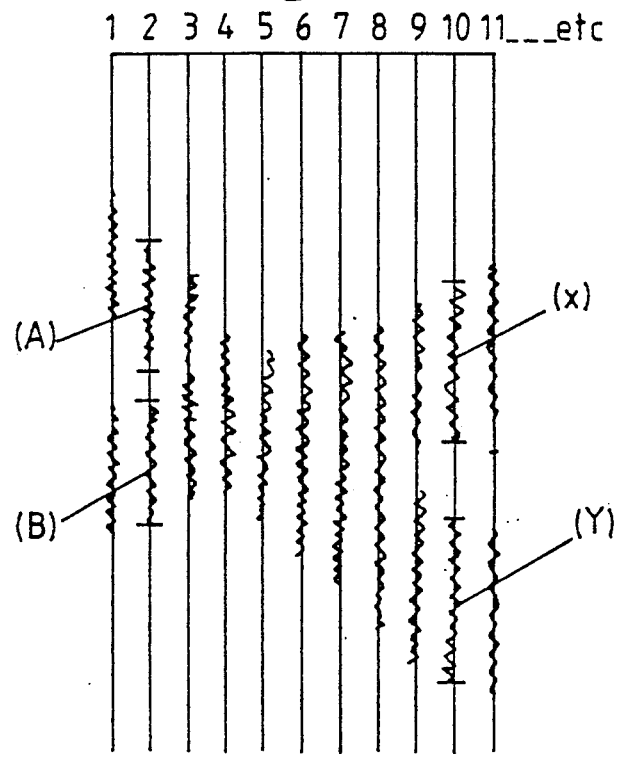
FIG. 6 is a diagrammatical view of a seismic survey system, with interference occurring from more than one source on different channels.

In a further development of the method according to the invention, interference and amplitude anomalies caused by a plurality of simultaneous surveys are monitored. Identification of interference occurs in the same manner as before, and in order to simplify the requirement of analyses, a quadrangle 4 is defined, as shown in FIG. 1. In case of a plurality of sources of interference this is, however, much more complicated, as more than one quadrangle cannot readily be determined with the identifications made. This situation is diagrammatically shown in FIG. 6, in which separate channels 1, 2, 3, etc. are again plotted along the horizontal axis, whereas the vertical axis indicates increasing recording time. If we assume that analysis of interference occurs in two channels, e.g. channels 2 and 10 as shown, interference events A and B can be identified in channel 2, and interference events X and Y in channel 10 without any necessity of deciding whether A and X or A and Y stem from the same source and hence should be incorporated in the construction of the quadrangle. Known technology provides a number of methods to solve this problem. It is for instance possible to analyze more than two channels to find the direction from e.g. A to Y, and the point of time when interference occurred in channels 2 and 10 can be estimated by the aid of extrapolation of the time interval between interference occurring on some previous recordings on the same channel. Furthermore, the time difference of arrival times of the interference events on channel 2, and 10, respectively, may be calculated by the aid of previous recordings. This difference in time does, in fact, change slowly, only depending on the velocity and course of the respective sources relative to the survey vessel which is used for the seismic survey in progress. By considering the parameters incorporated in the recording, and the possibilities of estimation which are present on the basis of known and previously recorded data, those skilled in the art will understand that other and, no doubt, more advanced methods may be developed to solve the above problem, even though problems of capacity as regards data processing will arise with such methods.

Those skilled in the art will understand that the method according to the present invention may also be modified for monitoring other kinds of noise occurring in limited time intervals and/or in a limited number of measuring points or channels. Time intervals and channels may vary with successive shot points. An example of noise which is recorded on some channels in the seismic streamer is noise caused by wave movement on the surface of the sea due to weather conditions. Such kinds of noise may be monitored by a method according to the present invention, but then recordings must be analyzed in all channels each time measurements or recordings are made.

I claim:

1. A method in a real time control system for seismic interference between separate seismic surveys carried out simultaneously in the same survey area, to indicate an acceptable level of interference in relation to amplitude, angle of incidence and frequency of seismic reflection signal, based on a trial recording or previous recording and to remove from the survey signals loaded with interference above said level of acceptance, in which a coverage of a point of reflection is determined by the number of shots reflected or the separation between the shot points and the number and distribution of detector arrays or channels in the seismic streamer, and in which the seismic survey comprises a number of recording series for the respective points of reflection, the method comprising:

(a) predetermining values of lower limits of coverage before each series of recordings, said lower limits of coverage being a selected minimum number of different shots contributing to the reflection from a single reflection point in a previous recording from the same survey area;

(b) identifying interference and amplitude anomaly in the recorded reflection signal, and comparing the amplitude characteristic of the recorded reflection signal with an expected value of the amplitude characteristic of the signal;

(c) estimating said expected value of the amplitude characteristic of the signal on the basis of recorded amplitude characteristics of recorded signals from at least one of the previous recordings, the identification of interference and amplitude anomaly being made in given time windows;

(d) marking those time windows in which interference and/or amplitude anomaly is identified;

(e) generating a table of the number of times a certain time window was marked in recordings which form part of the series of recordings of the same point of reflection;

(f) assigning limits of the number of interference events to differently marked time windows with different limits being possible for different time windows; and (g) removing those time windows in which the number of interference events exceeds the assigned limits from the recording.

2. A method as claimed in claim 1, wherein: if the number of times a certain time window was marked will cause coverage of the recording series to drop below a lower threshold level of coverage, which was determined for a previous series of recordings, interrupting the seismic survey.

3. A method as claimed in claim 2, and further comprising:
comparing the rms value of amplitude characteristic of a reflection signal with an expected rms value of the rms amplitude characteristic of the signal.

4. A method as claimed in claim 3, and further comprising:
recording all measuring points or channels, as well as marked time windows in which interference or amplitude anomaly was identified for a common point of reflection.

5. A method as claimed in claim 1, and further comprising:
comparing the rms value of amplitude characteristic of a reflection signal with an expected rms value of the rms amplitude characteristic of the signal.

6. A method as claimed in claim 1, and further comprising;
recording the starting point of time of an interference event and/or amplitude anomaly and its duration at two measuring points or channels in the seismic streamer, the measuring points being spaced apart by a distance of at least a hundred meters.

7. A method as claimed in claim 1, and further comprising:
recording all measuring points or channels, as well as marked time windows in which interference or amplitude anomaly was identified for a common point of reflection.

8. A method as claimed in claim 1, wherein:
if maximum coverage of a point of reflection is given by an integer value 2M, monitoring and identification of interference and amplitude anomaly are only carried out for every M'th common point of reflection.

9. A method as claimed in claim 1, in which interference and amplitude anomaly are caused by more than one source, and further comprising:
analyzing interference and amplitude anomaly identified in more than one channel to determine which of the sources causes interference and/or amplitude anomaly, and assigning any separate interference event and/or amplitude anomaly to the source causing it.

10. A method as claimed in claim 9, wherein:
said analysis of interference and/or amplitude anomaly caused by more than one source is made in the time or space domain.

11. A method as claimed in claim 9, and further comprising:
recording the starting point of time of an interference event and/or amplitude anomaly and its duration at two measuring points or channels in the seismic streamer, the measuring points being spaced apart by a distance of at least a hundred meters.

12. A method as claimed in claim 11, wherein:

if maximum coverage of a point of reflection is given by an integer value 2M, monitoring and identification of interference and amplitude anomaly are only carried out for ever M'th common point of reflection.

13. A method as claimed in claim 11, in which interference and amplitude anomaly are caused by more than one source, and further comprising:

analyzing interference and amplitude anomaly identified in more than one channel to determine which of the sources causes interference and/or amplitude anomaly, and assigning any separate interference event and/or amplitude anomaly to the source causing it.

14. A method as claimed in claim 13, wherein:

said analysis of interference and/or amplitude anomaly caused by more than one source is made in the time or space domain.

* * * * *